A. G. PAUL.
HEATING SYSTEM.
APPLICATION FILED MAY 15, 1900.
1,008,054.
Patented Nov. 7, 1911.
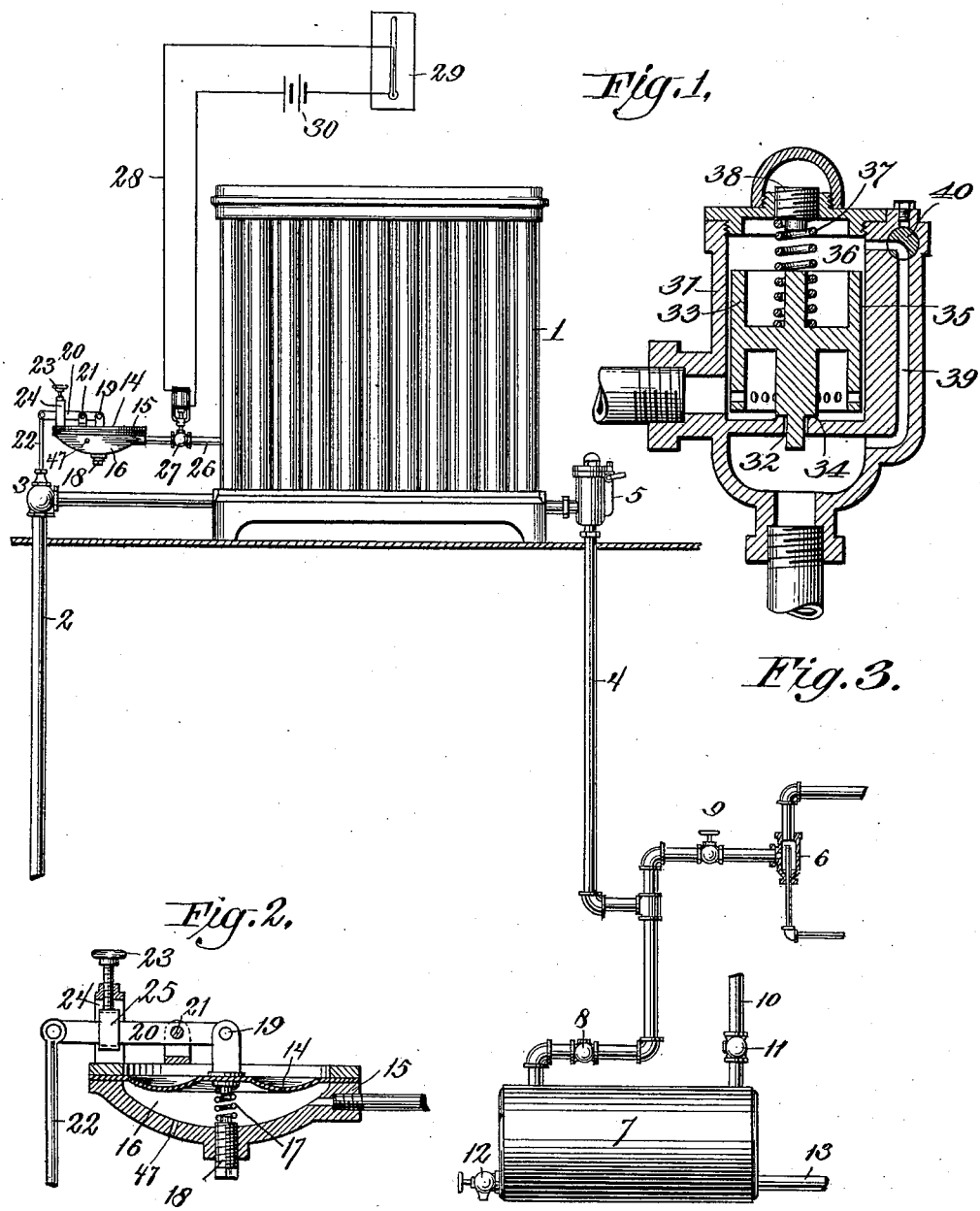

UNITED STATES PATENT OFFICE.

ANDREW G. PAUL, OF BOSTON, MASSACHUSETTS.

HEATING SYSTEM.

1,008,054.  Specification of Letters Patent.  Patented Nov. 7, 1911.

Application filed May 15, 1900. Serial No. 16,812.

*To all whom it may concern:*

Be it known that I, ANDREW G. PAUL, a citizen of the United States, residing in Boston, in the county of Suffolk and State of Massachusetts, have invented a new and useful Improvement in Heating Systems, of which the following is a full, clear, and exact specification, reference being had to the accompanying drawings, which form a part hereof.

This invention relates to a heating system wherein steam or other suitable heating agent is circulated for the purpose of conveying and imparting heat to the places desired, and it consists in an improved construction and arrangement of the parts of such a system.

One object of my invention is to automatically control the operation of the system by means of the pressure of the heating vehicle within the system, and at the same time to secure the discharge of the air and water of condensation from the system automatically and positively.

Another object of the invention is to automatically and positively control both the supply of the heating vehicle to the system and the discharge of air and water of condensation therefrom.

Another object of the invention is to enable the effective heating work done by the system to be accurately regulated and controlled, and to operate the system economically.

Another object is to enable the amount of the heating surface which is put into operation, to be varied and regulated according to the needs of the system.

My invention consists first in the combination in a heating system of a heater or radiator of any form, means for controlling the operation of the same, a fluid pressure motor controlling said means and connected with the heater or radiator in any suitable manner so as to be operated by the pressure therein, and a discharge pipe, a valve in said discharge pipe provided with a suitable discharge port for the discharge of the water, a piston controlling said port, a fluid pressure chamber on one side of said piston, a passage for air or gas or vapor connecting the fluid pressure chamber with the chamber on the other side of the piston, a passage connecting the fluid pressure chamber with the discharge pipe, and an exhausting device connected with the discharge pipe. In the best form of my invention the motor for controlling the operation of the system is connected with the supply valve.

My invention also consists in combining with some or all of the parts above enumerated, a thermostat to control the connection between the system and the motor.

My invention also consists in certain other features and combinations of parts hereinafter described and claimed.

My invention is shown in the accompanying drawings, in which—

Figure 1 shows a system in which the pressure within the radiator governs and controls the supply valve. Fig. 2 shows a section of the diaphragm to operate the supply valve. Fig. 3 shows a section of the discharge valve.

Similar numbers denote similar parts in the different figures.

In Figs. 1 and 2, 1 is a heater or radiator of any suitable construction. 2 is a supply pipe. 3 a supply valve. 4 is a discharge pipe, 5 the discharge valve on the discharge pipe; 6 is an exhauster of any suitable construction; 7 is a tank or reservoir for the water of condensation; 8 is a check valve on the discharge pipe; 9 is an ordinary hand valve to shut off the exhauster; 10 is a relief pipe provided with a check valve 11, or any other suitable form of valve; 12 is a cock for drawing off the water of condensation; 13 is a pipe through which the water of condensation can be pumped to the boiler or removed from the tank 7. 14 is a diaphragm of any ordinary construction supported in a casing 15 provided with a fluid pressure chamber 16 underneath the diaphragm. 17 is a coiled spring adapted to press against the diaphragm. The tension of this spring can be regulated and varied by the screw 18. 19 is an arm suitably connected with the diaphragm and pivoted to the lever 20 which is fulcrumed at 21. The outer end of the lever 20 is connected by rod 22 with the supply valve. 23 is a screw supported in a post 24 projecting up from the casing of the diaphragm. The lower end of the screw carries a loop 25 encircling the lever 20. By screwing the screw 23 up or down, the supply valve can be opened or closed and locked in that position, or the extent to which it opens can be regulated. The lever 20 is given sufficient play in the loop 25 to enable the valve to be opened or closed by the diaphragm when the loop is in a middle position. 26 is a pipe connecting the radiator with the fluid pressure chamber 16. 27 is a solenoid valve on said pipe connected by the circuit 28 with the thermostat 29 which is adapted to be placed upon the wall of the room or in any other suitable position. 30 is an electric battery or generator. Any other suitable connecting means may be employed to connect the thermostat with the valve 27. The fluid pressure chamber 16 is provided with a vent of any ordinary form, such as a pin-hole 47 through the casing or any other suitable form of vent can be used.

In Fig. 3 the construction of the discharge valve is shown. 31 is a suitable casing provided with the discharge port 32. 33 is a piston provided at its lower end with a valve 34 to close the discharge port for the water. This piston is made somewhat smaller than the casing so as to provide a passage 35 between it and the wall of the casing for the escape of air or gas or vapor. 36 is a fluid pressure chamber on top of the piston. 37 is a coiled spring bearing upon the top of the piston, the tension of which can be regulated by the screw 38 which screws into the upper part of the casing. 39 is a passage connecting the fluid pressure chamber with the discharge pipe beyond the discharge port for the water. 40 is an ordinary valve in this passage, by means of which it can be closed.

The operation of the discharge valve is as follows: When air or gas collects in the pipe leading from the radiator to the discharge valve, it is drawn out by the operation of the exhauster through the passage 35, the fluid pressure chamber 36, and enters the discharge pipe without causing any motion of the piston 33. When, however, any substantial quantity of water collects in the lower part of the valve device this water operates to seal the passage 35, as a result of which the exhauster produces a more or less complete vacuum in the fluid pressure chamber 36, which causes the piston 33 to be lifted thereby opening the water discharge port, and causing the discharge of the water, or of water together with air or gas. As soon as the water has been discharged, the piston again closes.

I do not herein claim separately this form of discharge valve, as it is claimed in my Patent No. 771,744 dated October 4th, 1904.

The operation of this apparatus is as follows. The exhauster is put into operation as a result of which the air is withdrawn from the radiator and the valve 27 being open the decreased pressure in the radiator causes the supply valve to open. Or the supply valve can be opened at the start by means of the screw 23. The heating vehicle enters the radiator and as soon as the pressure in the radiator reaches the desired or predetermined point, this pressure operating upon the diaphragm 14 closes the supply valve. When the pressure in the radiator again falls below the desired point, the supply valve is again opened and a fresh quantity of heating vehicle enters the system. Thus the system continues to operate with the heating vehicle therein at the predetermined or desired pressure. If the supply valve was first opened by means of the screw 23, as soon as the radiator is in operation the screw 23 must be adjusted again so as to permit the diaphragm to be operated automatically by the pressure in the radiator. The air and gas and water are drawn out through the discharge valve in the manner described in my Patent No. 771,744 above referred to, so that the radiator is kept substantially free from air and water. When the room in which the thermostat 29 is placed has been heated up to the desired or predetermined point, this thermostat operates to close the valve 27 on the pipe 26. The pressure upon both sides of the diaphragm 14 is then equalized and the supply valve is then shut and remains shut so long as the temperature of the room which is being heated remains above the desired point. When the temperature of the room falls below this point the valve 27 is again opened, the heating vehicle is admitted to the radiator, and the radiator continues to perform its heating work in the manner already set forth.

Some of the advantages of my invention are as follows. The system is made to operate at a predetermined pressure so that the amount of effective heating work done by the system can be accurately regulated as may be desired. The air and gas and water of condensation are removed positively and automatically. The heating vehicle is supplied in just the requisite quantities to do the required work. The amount of heating surface brought into operation can also be controlled according to the needs of the system by the thermostat placed in the room or apartment to be heated.

What I claim as new and desire to secure by Letters Patent, is:

1. In a heating system the combination of a heater or radiator, means for controlling the operation of the same, a fluid pressure motor controlling said means and connected with the heater or radiator so as to be operated by the pressure therein, a discharge pipe, a valve device in said discharge pipe having a suitable valve casing, a port for the discharge of the water, a piston controlling said port, the valve device being provided with a fluid pressure chamber on one side of said piston, an air passage connecting the fluid pressure chamber with the chamber on the other side of the piston, and a passage connecting the fluid pressure chamber with the discharge pipe and an exhausting device connected with the discharge pipe, substantially as set forth.

2. In a heating system the combination of a heater or radiator, means for controlling the operation of the same, a fluid pressure motor controlling said means, a fluid pressure chamber on one side of said motor and a passage connecting the fluid pressure chamber with the heater or radiator, a discharge pipe, a valve device in said discharge pipe having a suitable valve casing, a port for the discharge of the water, a piston controlling said port, the valve device being provided with a fluid pressure chamber on one side of said piston, an air passage connecting the fluid pressure chamber with the chamber on the other side of the piston, and a passage connecting the fluid pressure chamber with the discharge pipe and an exhausting device connected with the discharge pipe, substantially as set forth.

3. In a heating system the combination of a heater or radiator, means for controlling the operation of the same, a fluid pressure motor controlling said means, a fluid pressure chamber on one side of said motor and a passage connecting the fluid pressure chamber with the heater or radiator, and a thermostat controlling said passage, a discharge pipe, a valve device in said discharge pipe having a suitable valve casing, a port for the discharge of the water, a piston controlling said port, the valve device being provided with a fluid pressure chamber on one side of said piston, an air passage connecting the fluid pressure chamber with the chamber on the other side of the piston, and a passage connecting the fluid pressure chamber with the discharge pipe and an exhausting device connected with the discharge pipe, substantially as set forth.

4. In a heating system the combination of a heater or radiator, a supply pipe, a valve on the supply pipe, a fluid pressure motor controlling said valve, the valve device being provided with a fluid pressure chamber on one side of said motor and a passage connecting the fluid pressure chamber with the heater or radiator, a discharge pipe, a valve device in said discharge pipe having a suitable valve casing, a port for the discharge of the water, a piston controlling said port, a fluid pressure chamber on one side of said piston, an air passage connecting the fluid pressure chamber with the chamber on the other side of the piston, and a passage connecting the fluid pressure chamber with the discharge pipe, and an exhausting device connected with the discharge pipe, substantially as set forth.

In testimony whereof, I have signed my name to this specification, in the presence of two subscribing witnesses.

ANDREW G. PAUL.

Witnesses:
THOMAS K. PETERS,
NANNIE FINLEY.

---

Copies of this patent may be obtained for five cents each, by addressing the "Commissioner of Patents, Washington, D. C."